(12) United States Patent
Darbyshire et al.

(10) Patent No.: US 10,604,046 B2
(45) Date of Patent: Mar. 31, 2020

(54) OCCUPANT SUPPORT DEVICE FOR A SEAT

(71) Applicant: Tangerine Limited, London (GB)

(72) Inventors: Martin Richard Darbyshire, London (GB); Adam James Thomas Loewy, London (GB)

(73) Assignee: Tangerine Limited, London (GB)

( * ) Notice: Subject to any disclaimer, the term of this patent is extended or adjusted under 35 U.S.C. 154(b) by 0 days.

(21) Appl. No.: 15/942,893

(22) Filed: Apr. 2, 2018

(65) Prior Publication Data

US 2018/0281648 A1 Oct. 4, 2018

(30) Foreign Application Priority Data

Apr. 3, 2017 (GB) .................. 1705339.8

(51) Int. Cl.
*B60N 2/72* (2006.01)
*B60N 2/70* (2006.01)
*A47C 1/024* (2006.01)
*A47C 7/46* (2006.01)
*B60N 2/01* (2006.01)
*B60N 2/22* (2006.01)
(Continued)

(52) U.S. Cl.
CPC .............. *B60N 2/72* (2013.01); *A47C 1/024* (2013.01); *A47C 7/462* (2013.01); *B60N 2/01* (2013.01); *B60N 2/22* (2013.01); *B60N 2/7011* (2013.01); *B60N 2/242* (2013.01); *B61D 33/0035* (2013.01); *B64D 11/064* (2014.12); *B64D 11/0647* (2014.12)

(58) Field of Classification Search
CPC ...... B60N 2/5816; B60N 2/5891; B60N 2/72; B60N 2/01; B60N 2/22; B60N 2/7011; B60N 2/242; A47C 1/024; A47C 7/462; B64D 11/064; B64D 11/0647; B61D 33/0035
See application file for complete search history.

(56) References Cited

U.S. PATENT DOCUMENTS

| 2,558,171 | A |   | 6/1951 | Chesley |           |
|-----------|---|---|--------|---------|-----------|
| 3,813,148 | A | * | 5/1974 | Kraus   | A47C 7/425 |
|           |   |   |        |         | 297/230.11 |

(Continued)

FOREIGN PATENT DOCUMENTS

EP        1177935 A2      2/2002

OTHER PUBLICATIONS

European Patent Application No. 18165233.0, Extended European Search Report dated Aug. 21, 2018, 8 pages.
(Continued)

*Primary Examiner* — Philip F Gabler
(74) *Attorney, Agent, or Firm* — Fredrikson & Byron, P.A.

(57) ABSTRACT

An occupant support device (OSD) for a seat, comprises a flexible membrane having a first end and a second end. The flexible membrane is coupleable to a seat proximate the first end and the second end of the flexible membrane. The OSD further comprises at least one stiffening member for stiffening the flexible membrane. The at least one stiffening member is positionable so that the flexible membrane is generally stiffer in a longitudinal direction than in a transverse direction. A seat comprising the OSD, an array of seats comprising the OSD and an aircraft comprising the OSD are also provided.

22 Claims, 8 Drawing Sheets

(51) Int. Cl.
*B64D 11/06* (2006.01)
*B60N 2/24* (2006.01)
*B61D 33/00* (2006.01)

(56) References Cited

U.S. PATENT DOCUMENTS

| | | | |
|---|---|---|---|
| 4,362,336 A | 12/1982 | Zapf et al. | |
| 4,790,496 A | 12/1988 | Marrujo | |
| 5,403,066 A | 4/1995 | Drum | |
| 5,806,910 A | 9/1998 | DeRees | |
| 6,102,482 A | 8/2000 | Dettoni et al. | |
| 6,478,381 B1 * | 11/2002 | Cramb, III | B60N 2/5825 297/452.13 |
| 6,669,143 B1 | 12/2003 | Johnson | |
| 6,802,568 B1 * | 10/2004 | Johnson | B64D 11/0696 297/452.13 |
| 7,686,392 B2 * | 3/2010 | Kenny | B60N 2/6018 297/188.06 |
| 8,696,066 B2 * | 4/2014 | Mizobata | B60N 2/682 297/440.11 |
| 9,327,835 B2 * | 5/2016 | Saada | B64D 11/06 |
| 2007/0001497 A1 | 1/2007 | Diffrient | |
| 2009/0195040 A1 | 8/2009 | Birkbeck | |
| 2009/0236896 A1 | 9/2009 | Baumann | |
| 2010/0117430 A1 | 5/2010 | Moeseneder et al. | |
| 2012/0048999 A1 | 3/2012 | Schürg et al. | |
| 2013/0127227 A1 | 5/2013 | Oleson | |
| 2013/0154325 A1 | 6/2013 | Carlin et al. | |
| 2015/0336494 A1 * | 11/2015 | Dodd | A41D 13/0153 297/452.1 |
| 2016/0325661 A1 | 11/2016 | Agarwal et al. | |
| 2016/0376007 A1 | 12/2016 | Meindlhumer | |
| 2017/0021930 A1 * | 1/2017 | Henshaw | B64D 11/064 |

OTHER PUBLICATIONS

GB Pat. App. No. 1705339.8, Combined Search and Examination Report under Sections 17 and 18(3), dated Jan. 22, 2018, 8 pages.

* cited by examiner

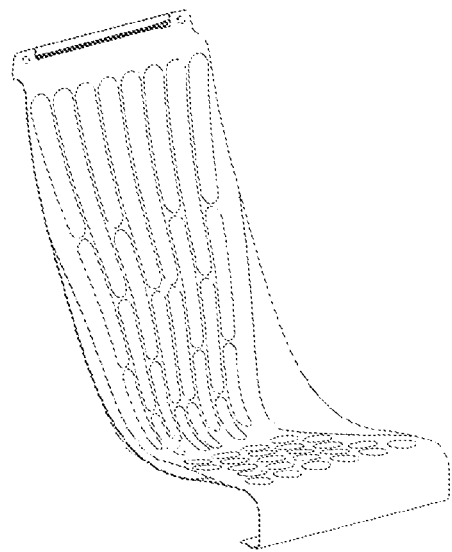 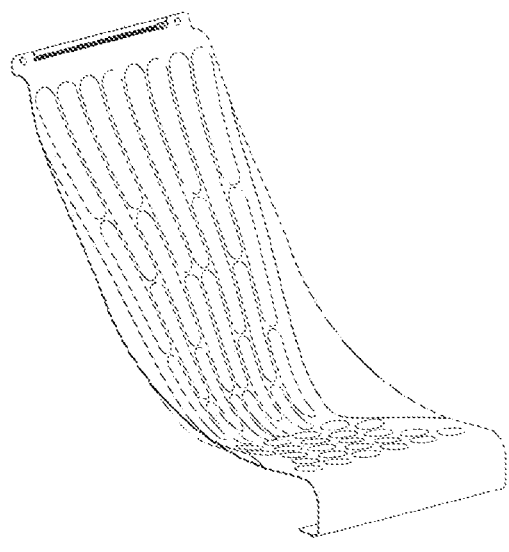
Figure 5　　　　　　　　　　Figure 6
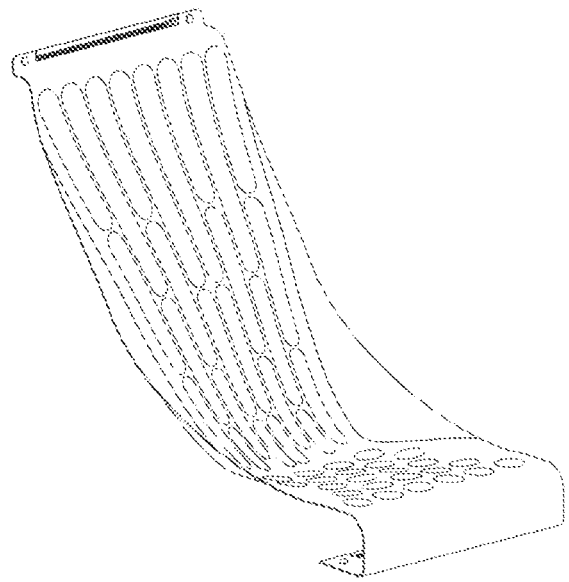
Figure 7

OCCUPANT SUPPORT DEVICE FOR A SEAT

RELATED APPLICATIONS

This application claims priority to British Application No. 1705339.8, filed Apr. 3, 2017, the teachings of which are incorporated herein by reference.

FIELD OF THE INVENTION

The invention relates to an occupant support device (OSD). The device is suitable for providing enhanced support for a seat occupant. The device is also suitable for providing enhanced comfort, or at least delaying or reducing the onset of discomfort, for a seat occupant.

The device is particularly suitable for use in conjunction with a seat for a vehicle.

BACKGROUND TO THE PRESENT INVENTION

Known seats for vehicles including aircraft, buses, coaches and trains, generally comprise a backrest provided with a back cushion and a seat base provided with a seat cushion. The backrest is typically articulated to the seat base and the seat is provided with a mechanism which includes an articulation between the seat back and seat base for enabling an occupant to recline the backrest.

These known seats do not provide optimum support for an occupant. For example, when the backrest is reclined, an occupant may be left with little support, particularly in the region of the articulation i.e. for the lumbar, buttock and thigh regions of a seat occupant's body. This can be uncomfortable for the occupant, particularly when they are occupying the seat for a prolonged period of time, for example on a long haul flight or a long train or coach journey.

The invention is concerned with addressing these issue by improving the support provided for a seat occupant.

SUMMARY OF THE INVENTION

In the following description of preferred embodiments of the present invention, the term 'longitudinal' or 'longitudinal direction' is used to mean in a direction extending along a length of a seat of a vehicle from one end (e.g. a head end) to the other end (e.g. a foot end). In other words, a longitudinal direction is one which extends substantially in the same direction as the spine of a seat occupant sitting in a upright configuration in a seat comprising the OSD embodying the present invention.

In the following description of preferred embodiments of the present invention, the term 'transverse' or 'transverse direction' is used to mean in a direction extending across a width of a seat of a vehicle from one side of a seat (e.g. a left side) to the other side of a seat (e.g. a right side). In other words, a transverse direction is one that is substantially perpendicular to the longitudinal direction—i.e. one that is substantially perpendicular to a spine of a seat occupant sitting in a upright configuration in a seat comprising the OSD embodying the present invention.

The present invention is defined in the appended independent claims and provides, in a first aspect an occupant support device for a seat, comprising:— a flexible membrane having a first end and a second end;

the flexible membrane being coupleable to a seat proximate the first end and the second end of the flexible membrane; and and at least one stiffening member for stiffening the flexible membrane;

wherein the at least one stiffening member is positionable so that the flexible membrane is generally stiffer in a longitudinal direction than in a transverse direction.

The invention in a first aspect therefore provides a device for enhancing the support for a seat occupant. The invention in a first aspect also provides a device for enhancing the comfort of a seat occupant, or reducing, or delaying the onset of, discomfort.

The invention is particularly suitable for use in conjunction with an Economy class seat on an aircraft. The invention is also suitable for use in conjunction with a seat on vehicles including buses, coaches and trains.

The invention may also be suitable for use in a chair, for example an office chair or casual chair, particularly where the level of recline is restricted and/or where a seat occupant may want to, or has need to, slide down or slouch in the chair.

Preferably, the flexible membrane is only coupleable to a seat proximate the first end and the second end of the flexible membrane so that a portion of the flexible membrane between the first end and the second end is moveable or adjustable relative to a seat. This may ensure that the bulk of the flexible membrane will tend to extend away or lift off from a seat and into supporting engagement with a body of a seat occupant, particularly as a seat back of the seat is reclined and/or a seat base of the seat is moved.

Preferably, the flexible membrane comprises a backrest portion, a seat base portion and an intermediate portion coupling the backrest portion and the seat base portion.

Preferably the flexible membrane further comprises side portions or bolster portions.

Preferably the backrest portion, the seat base portion and the intermediate portion are coupled to one another in such a way that the flexible membrane is provided with a basic shape that approximates and generally conforms to a general shape of a seat occupant's body. For example, the backrest portion, the seat base portion and the intermediate portion (and the side portions or bolster portions where present) may be coupled by stitching them to one another in a tailored fashion so that the flexible membrane is preformed or pre-curved in a manner which complements the general shape of an occupant's body in a sitting position. It will therefore be appreciated that the flexible membrane may be configured to have a three-dimensional (or sculpted) shape.

Preferably, the flexible membrane is positionable on, and coupleable to, a seat so that the backrest portion of the flexible membrane at least partially overlies a backrest of a seat, so that the seat base portion of the flexible membrane at least partially overlies a seat base of a seat and so that the intermediate portion of the flexible membrane at least partially overlies an articulation between a backrest of a seat and a seat base of a seat. It will be appreciated that the flexible membrane may engage with an underlying seat more readily or completely when the seat is in an upright configuration and that as the seat is reconfigured to a more reclined or relaxed (e.g. an in-flight or in-journey) configuration, the flexible membrane will tend to extend away or lift off from a surface of a seat and into supporting engagement with an underside of the body of a seat occupant.

Preferably, the flexible membrane is provided with at least one pocket into which at least one stiffening member is insertable. This may enable a stiffening member to be easily inserted and held in position relative to the flexible membrane but also removed if desired.

More preferably, the flexible membrane may be provided with a plurality of pockets into which a plurality of stiffening members is insertable. This may enable a plurality of stiffening members to be easily inserted and held in position relative to the flexible membrane but also removed (or moved/repositioned) if desired. These stiffening members provide enhanced support for an occupant. They may enable the flexible membrane to adopt the three-dimensional shape complementing the occupant's body as discussed above. They may also facilitate coupling and decoupling of the OSD from a seat with which it may be used by maintaining a three-dimensional or 'sculpted' shape of the flexible membrane as it is lifted onto and off a seat. The stiffening members may enable the support provided across an area of the flexible membrane to be varied and to provide additional comfort enhancing features such as a lumbar support for an occupant's lower back or an intermediate portion with more defined curvature for receiving an occupant's buttocks and thighs.

Preferably, the at least one pocket or the plurality of pockets is provided on a side opposite an occupant-engaging side of the flexible membrane (i.e. on an underside of the flexible membrane between a seat occupant and a seat). This may improve the comfort of the device for a seat occupant.

Preferably, the flexible membrane is provided with a plurality of pockets substantially over the whole of an area of the flexible membrane, or at least substantially over the whole of the backrest and intermediate portions of the flexible membrane, into which a plurality of stiffening members is insertable. This may help to ensure that the device offers effective and distributed support over the surface of the flexible membrane. It may also enable the device to be configured by selective insertion of the stiffening members into only some of the pockets and/or by using stiffening members of different thickness and/or lengths and/or widths, and/or by using stiffening members made from different materials.

Preferably, at least two of the stiffening members are arranged in a staggered arrangement so that at least one pair of transversely adjacent stiffening members only partially overlap in a longitudinal direction. This may facilitate twisting of the membrane during use which may make it easier for an occupant to experiment with and adopt different positions in a seat. It may also be beneficial where for example, the device is to be used with a seat having a swivelling seat base.

Preferably, one or the more of the plurality of stiffening members is arranged to extend from the backrest portion of the flexible membrane around the intermediate portion and onto the seat base portion of the flexible membrane, either continuously or by way of two or more stiffening members positioned substantially end-to-end. This may provide improved support for a seat occupant's lower back, waist and buttocks and thereby provide improved comfort.

Preferably, the plurality of pockets is configured so the at least one stiffening member positionable in a pocket in the backrest portion of the flexible membrane is longer than at least one stiffening member positionable in a pocket in the seat base portion of the flexible membrane. This may ensure that the device provides effective support for a seat occupant while enabling it to adapt to the contours of an occupant's body and more closely conform to the curved shape of an occupant's lower back, waist and buttocks when in a sitting position.

Preferably, the at least one stiffening member comprises a flexible material. This may ensure that it is able to adapt and conform more easily to the shape of an occupant's body.

Preferably, the at least one stiffening member is made from relatively thin material. This may help to ensure that the device causes only a very small increase, or potentially no increase, in the thickness of the OSD and thereby in the overall thickness of a seat comprising the device.

Preferably, the flexible membrane comprises a breathable fabric. The flexible membrane may alternatively comprise a perforated or a vented membrane. This may ensure that air can pass through the membrane to keep the seat occupant's skin cool and carry moisture away.

Preferably, the flexible membrane comprises a woven fabric. This may be a suitable fabric for achieving the objectives of the flexible membrane described in this specification.

Preferably, the flexible membrane comprises a poly cotton fabric. This may be a suitable fabric for achieving the objectives of the flexible membrane described in this specification.

Preferably, the flexible membrane comprises a thin padded fabric cover (or 'topper'). This may help to provide additional comfort for a seat occupant.

Preferably, the flexible membrane is removably coupleable to a seat. This may facilitate removal of the device for cleaning and/or adjustment, and/or repair and/or or replacement.

Preferably, at least one end (i.e. a first and/or a second end) of the flexible membrane extends around a first end and/or a second end of a seat and is removably coupleable to a seat on a side opposite to an occupant-engaging side of a seat. This may provide a simpler method of attachment of the device to a seat and/or ensure that the coupling means does not cause an occupant any discomfort.

Preferably, the flexible membrane is removably coupleable to a seat using at least one quick release fastener. The same or different quick release fasteners may be used to secure each of the first and second ends of the flexible membrane to a seat. More than one type of quick release type fastener may be used. For example, the flexible membrane may be coupleable to a seat by a combination of press studs and zip fasteners.

The present invention is defined in the appended independent claims and provides, in a second aspect provides a seat for a vehicle, comprising the occupant support device of the invention in the first aspect. This provides a self-contained integrated seat unit which offers the enhanced support and comfort associated with the support device of the invention in the first aspect.

The present invention is defined in the appended independent claims and provides, in a third aspect provides a seat for a vehicle, comprising:— a backrest portion, a seat base portion, an articulation between the backrest portion and the seat base portion so that the backrest is reclinable;

a seat base adjustment mechanism configured to permit movement of the seat base portion; and the occupant support device of the invention in a first aspect.

This provides a self-contained integrated seat unit which offers the enhanced support and comfort associated with the support device of the invention in the first aspect. It may also ensure that the benefits of the support device are optimised.

Preferably, the seat base adjustment mechanism permits both sliding and tilting movement of the seat. This provides a self-contained integrated seat unit which offers the enhanced support and comfort associated with the support device of the invention in the first aspect. It may also ensure that the benefits of the support device are optimised.

The present invention is defined in the appended independent claims and provides, in a fourth aspect an array of seats comprising at least one of an occupant support device of the invention in first aspect or at least one of the seat of the invention in the second or the third aspect. This provides an array of seats which offers the enhanced support and comfort associated with the support device of the invention in the first aspect. It may also ensure that the benefits of the support device are optimised.

The present invention is defined in the appended independent claims and provides, in a fifth aspect a vehicle comprising at least one of the occupant support device of the invention in the first aspect of the invention or at least one of the seat of the invention in the second aspect or the third aspect of the invention or at least one array of seats of the invention in the fourth aspect of the invention. This provides a vehicle which offers the enhanced support and comfort associated with the support device of the invention. It may also ensure that the benefits of the support device are optimised. The aircraft may further comprise a plurality of the OSD of the invention in the first aspect of the invention or a plurality of the seat of the invention in the second aspect or the third aspect of the invention or a plurality of the array of seats of the invention in the fourth aspect of the invention.

In this specification, the OSD is described as being suitable for use in conjunction with a known type of seat for a vehicle, for example a seat having a cushioned backrest and cushioned seat base. It is also envisaged that the OSD may be used in place of the traditional cushioned backrest and cushioned seat base. In other words, the OSD may be suitable for use as the sole means of supporting an occupant in a seat.

Any feature in one aspect of the invention may be applied to other aspects of the invention, in any appropriate combination. In particular, method aspects may be applied to apparatus aspects, and vice versa. Furthermore, any, some and/or all features in one aspect can be applied to any, some and/or all features in any other aspect, in any appropriate combination.

It should also be appreciated that particular combinations of the various features described and defined in any aspects of the invention can be implemented and/or supplied and/or used independently.

BRIEF DESCRIPTION OF THE FIGURES

One or preferred embodiments of the present invention will be now be described with reference to the accompanying drawings in which:—

FIG. 5 is a perspective view of the OSD of FIG. 1 in an upright configuration;

FIG. 6 is a perspective view of the OSD of FIG. 1 in partially reclined configuration;

FIG. 7 is a perspective view of the OSD of FIG. 1 in more fully reclined configuration;

DETAILED DESCRIPTION OF PREFERRED EMBODIMENTS

Figure 1:
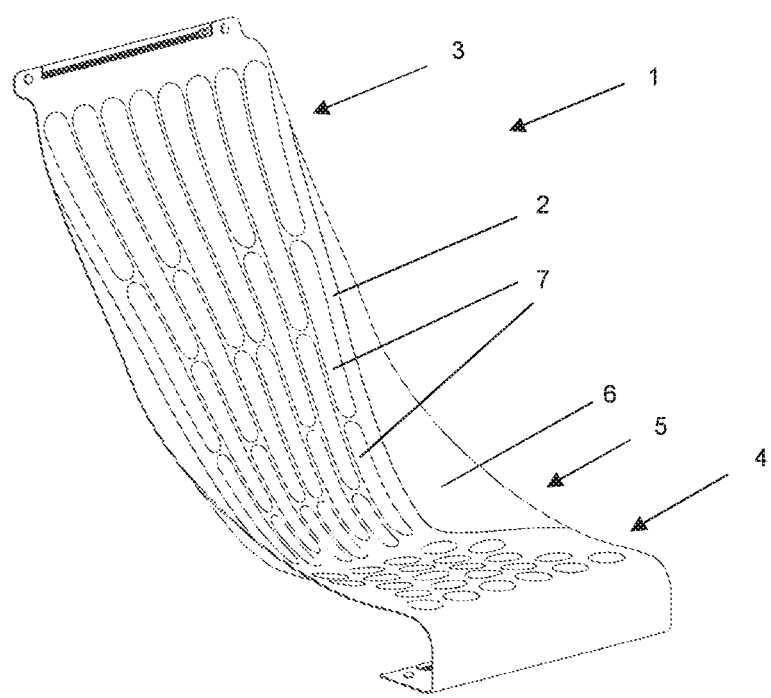
FIG. 1 is a perspective view of an OSD embodying the present invention.

FIG. 1 provides an example of an OSD or support enhancement device 1 embodying the present invention. As described further below, the OSD is configured to co-operate with a seat for a vehicle and to provide additional or enhanced support for a seat occupant as compared to the support provided by a seat alone without the OSD. The OSD may also be suitable for providing enhanced comfort, or at least delaying or reducing the onset of discomfort, for a seat occupant.

Figure 2:
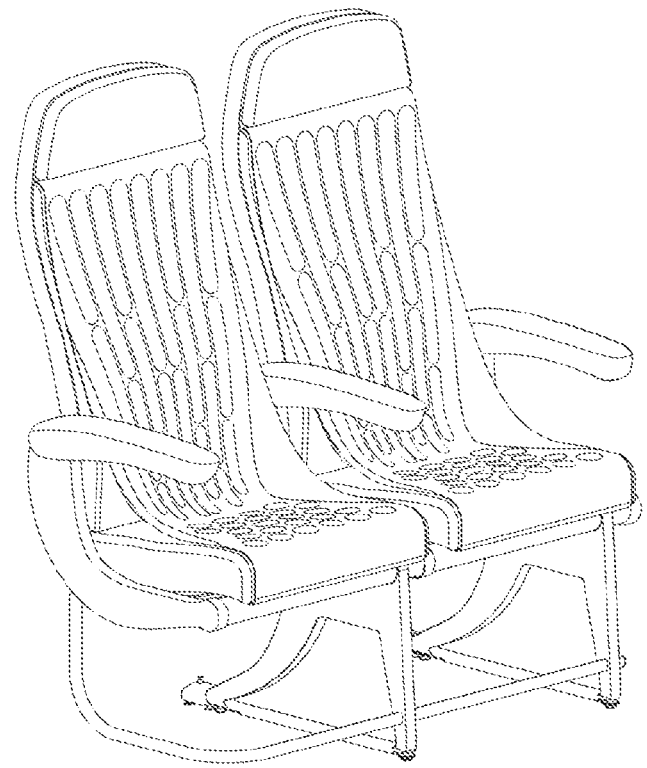
FIG. 2 is a perspective view of a pair of seats for a vehicle comprising the OSD of FIG. 1.

As shown in FIG. 2, the OSD may be used in conjunction with an existing type of seat such as an existing Economy Class seat for an aircraft. It may be advantageous for the OSD to be used in conjunction with a seat in which the thickness of the backrest cushion and/or seat cushion is reduced to accommodate a thickness of the OSD. This may prevent any overall increase in a thickness of the seat being caused by inclusion of the OSD. It may also not be necessary for a sitting surface of the seat (i.e. the surface that would normally engage with a seat occupant) to be finished (e.g. upholstered or otherwise covered) in the manner that is usually required when the OSD is not present.

Alternatively, the OSD may be used in conjunction with a novel type of seat.

General Structure and Arrangement of the OSD

The OSD generally comprises an elongate flexible membrane 2. The flexible membrane generally comprises a backrest portion (or upper portion) 3, a seat base portion (or lower portion) 4 and an intermediate portion 5 coupling and extending between the backrest portion and the seat base portion. The flexible membrane preferably also has side portions or bolster portions 6. The various portions may be attached to one another using a suitable method, for example by stitching or by way of a suitable adhesive.

The flexible membrane may be assembled from pre-cut contoured panels so there is some tailoring of the fit between the backrest portion, the intermediate portion and the seat base portion. This may introduce a three dimensional profile to the shape of the device, giving it a sculpted configuration. It may ensure that in an unloaded condition, a basic shape of the device is more closely matched to the shape of an occupant.

The flexible membrane may be optionally provided with some padding for additional comfort. The side supports or bolsters may be provided with some additional padding. This may be wadding inside a portion or portions of the flexible membrane, where for example it is formed from a double-layer. Alternatively, it may be an external padded layer provided on an outer surface of the membrane.

There are a number of physical demands on the flexible membrane. It is required to support an occupant's weight, while being flexible enough to conform to an occupant's body and substantially to resist stretching. In particular when the OSD is used on a vehicle such as an aircraft, the flexible membrane will also be required to comply with the relevant regulations on flammability, heat release and toxicity. The membrane will also need to breathable as it will as it will be in close proximity to an occupant's skin and therefore needs to enable moisture to pass through it and away from the occupant's skin.

As described further below, the membrane is generally configured so that the backrest portion 2 is generally stiffer than the intermediate portion 5 and seat base portions 4. The membrane is also generally configured so that it can curve and conform more easily to an occupant's body in the transverse direction—i.e. around an occupant's back from one side to the other—than in the longitudinal direction—i.e. along a the length of the occupant's back. This has the effect of enabling the membrane to wrap around the back of an occupant's back in the transverse direction and at least partially envelope them, while being stiffer in the longitudinal direction (i.e. down a length of an occupant's back) so as to provide greater support in the longitudinal direction than in the transverse direction.

In the embodiment shown in FIGS. 1 and 2, the OSD is provided with a plurality of stiffening members or stiffening ribs 7. These stiffening members may be elongate, thin and relatively narrow. They have a degree of flexibility but are relatively stiff so as to provide effective support for a seat occupant.

The stiffening members are insertable into pockets formed in the flexible membrane. The pockets are preferably formed on a back side of the flexible membrane—i.e. a side opposite an occupant-engaging side of the membrane. The pockets may be integrally formed with the membrane or formed by attaching the pockets to the membrane, for example by stitching them to the back side of the membrane.

The stiffening members will be arranged in a suitable manner depending on the expected physical requirements of the OSD. Preferably, substantially the whole of at least a backrest portion of the OSD is provided with stiffening ribs as that is the portion of the OSD that is required to do most work in providing support for an occupant's back. Stiffening members are preferably also provided in the intermediate region of the OSD for providing support for an occupant's buttocks. Stiffening members may optionally also be included in the seat base portion of the OSD. The latter stiffening members for the seat base portion may be shorter than those in the backrest portion or have a different shape.

Preferably, the pockets are positioned so that the stiffening members are all orientated substantially in the longitudinal direction. Alternatively, one or more of the pockets may be positioned so that one or more of the stiffening members may be angled to the longitudinal direction or positioned in a substantially transverse direction.

In a region of the OSD configured to underlie the upper back and shoulders of an occupant, the stiffening ribs are likely to be relatively longer and narrower and thereby have a relatively higher aspect ratio, for example of between about 5:1, or about 6:1, or about 7:1, or about 8:1, or about 9:1 and about 15:1, or about 14:1, or about 13:1, or about 12:1, or about 11:1, preferably about 10:1. In a region of the OSD configured to underlie the lower back, waist and buttocks of an occupant, the stiffening ribs are likely to be relatively shorter and wider and thereby have a relatively lower aspect ratio, for example of between about 2:1, or about 3:1, or about 4:1 and about 8:1, or about 7:1, or about 6:1, or about 5:1.

Some or all of the stiffening members 7 may comprise pointed, tapered or rounded ends.

At least some of the pockets may be arranged so that the stiffening members are staggered. In other words, at least some pairs of adjacent stiffening members in the transverse direction may be at least partially offset, or partially overlap, in the longitudinal direction.

This overlapping and tapering of the stiffening members may provide a feathering of the transfer of load between stiffer and more pliable areas of the flexible membrane to avoid a hard transition occurring which might otherwise reduce the occupant's comfort. It may also enable a seat occupant (or other person responsible for adjustment of the device) to adjust the distribution of stiffness over an area of the flexible membrane.

At least some of the pockets may be arranged so at least some of the stiffening members may extend from the backrest portion of the flexible membrane around the intermediate portion and onto the seat base portion. In other words, at least some of the stiffening members may be arranged to extend around the intermediate portion of the flexible membrane and thereby extend around the lower back, buttocks and thighs of a seat occupant to provide additional support. They may either run continuously from the backrest portion around the intermediate portion and onto the seat base portion or may be comprised of two or more shorter stiffening members positioned substantially end-to-end within a single continuous pocket or discrete longitudinally adjacent pockets.

In addition to providing increased support for an occupant, the arrangement of pockets and stiffening members may provide increased comfort and reduce pressure points, thereby reducing or delaying the onset of discomfort and/or pain, particularly on long journeys.

As described above, the OSD is generally configured to curve and conform more easily to a shape of an occupant's body in the transverse direction than in the longitudinal direction. However, it may be desirable for the intermediate portion of the OSD to be configured so that it is able to curve more acutely in the longitudinal direction than in the transverse direction, to help it to form around the occupant's waist, buttocks and thighs.

In an alternative embodiment of the OSD, the stiffening members may comprise larger components (e.g. rectangular panels) or sheets or panels of prearranged and interlinked stiffening members insertable within pockets in the flexible membrane which may provide larger stiffening zones.

The stiffening members may have a preformed curvature built into them when viewed in side elevation. For example, one or more stiffening members designated for the backrest portion may be pre-formed to have a convex curve to provide increased support for an occupant's back (e.g. as a lumber support for the lower back). In another example, one or more stiffening members designated for the intermediate portion and/or seat base portion may be pre-formed to have a concave curve to compliment the occupant's body when in an sitting position. The OSD may therefore be preformed with support enhancement to urge the occupant's body into a position in which they will be more effectively supported and thereby reduce or delay the onset of discomfort and/or pain.

The flexible membrane is made from a thin, flexible sheet material. The flexible membrane is preferably made from a substantially non stretchable material. However, it may be provided with a limited degree of elasticity to provide an initial softening effect when an occupant first sits in a seat fitted with the OSD.

In light of the physical requirements outlined above, the flexible membrane may for example be made from any type of woven material. One suitable material is a thin poly cotton. Other suitable materials for the flexible membrane will be apparent to the skilled person.

The stiffening members are made from a relatively thin, flexible material. Preferably, the material selected will be one that is substantially non-flammable. Suitable materials include Phenol formaldehyde resins (PF) or phenolic resins. Other suitable materials include composite materials such as fibre-reinforced polymers and carbon fibre. Other suitable materials for the stiffening members will be apparent to the skilled person.

Optional Topper

Figure 3:
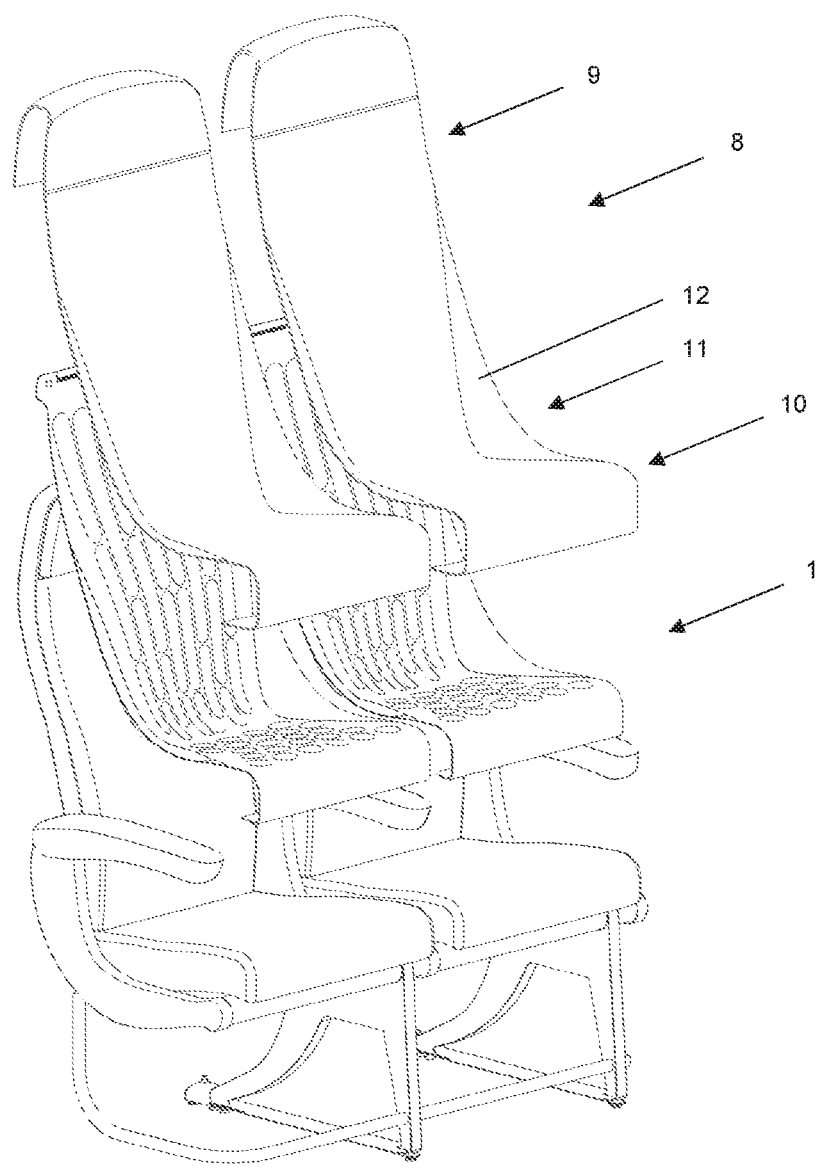
FIG. 3 is an exploded perspective view of a pair of seats for a vehicle comprising the OSD of FIG. 1 and an optional topper.

As shown in FIG. 3, the OSD may be partially or substantially covered by a flexible outer layer or topper 8. This may be a flexible padded layer. This arrangement may be thought of as akin to a mattress having a mattress topper in that the underlying OSD, like the mattress, provides the support for an occupant lying on it and the padded layer or topper provides additional comfort for the occupant while still enabling them to benefit from the additional support provided by the underlying OSD or mattress.

The topper generally conforms to the shape and configuration of the flexible membrane in that it generally comprises a backrest portion 9, a seat base portion 10, an intermediate portion 11 coupling and extending between the backrest portion and the seat base portion. It may also have side portions or bolster portions 12. The topper therefore fits snugly over the OSD. This also enables the flexible membrane and the topper to move in conjunction with one another to conform to the shape of a seat occupant and provide them with additional support and additional comfort.

The topper may be made from any suitable flexible sheet material. It may comprise a layer of internal wadding or a later of padding on an outer surface to provide enhanced comfort for the seat occupant. It may have an outer cover made of woven seat fabric, which has a layer of foam wadding and backing attached to the back of it, to give it some structure. Other suitable materials for the optional topper will be apparent to the skilled person.

The topper may wrap over the edges of the membrane and be attached to the membrane with a suitable fastener such as a hook and loop fastener. Alternatively, the flexible membrane may be inserted into a pocket within the topper. The topper is preferably removable from the OSD to enable it to be cleaned.

Coupling of the OSD to a Seat in a Vehicle

Figure 4:
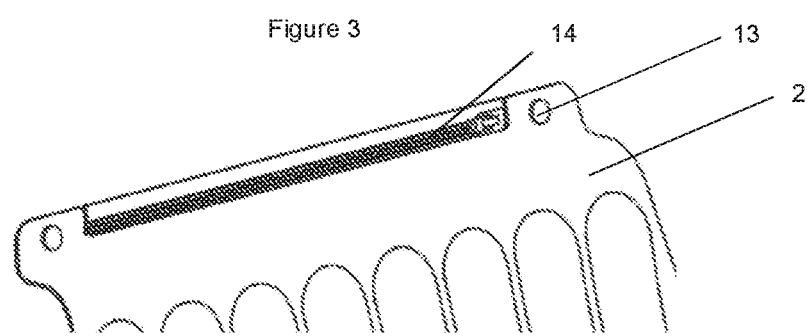
FIG. 4 is a close up perspective view of a portion of the OSD of FIG. 1.
Figure 8:
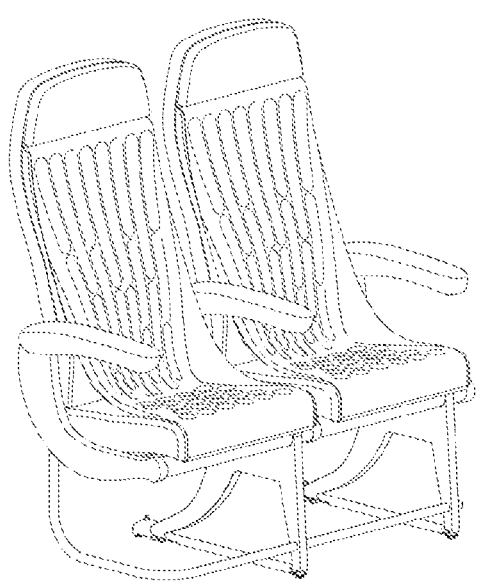
FIG. 8 is a perspective view of a pair of seats for a vehicle comprising the OSD of FIG. 1 in an upright configuration.
Figure 9:
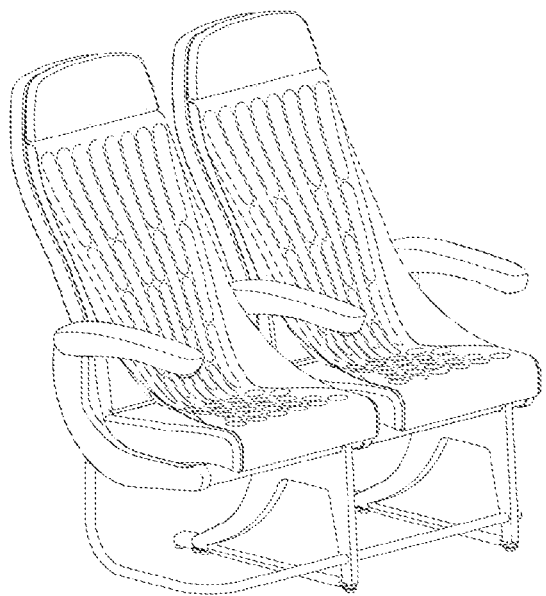
FIG. 9 is a perspective view of a pair of seats for a vehicle comprising the OSD of FIG. 1 in partially reclined configuration compared to FIG. 8.
Figure 10:
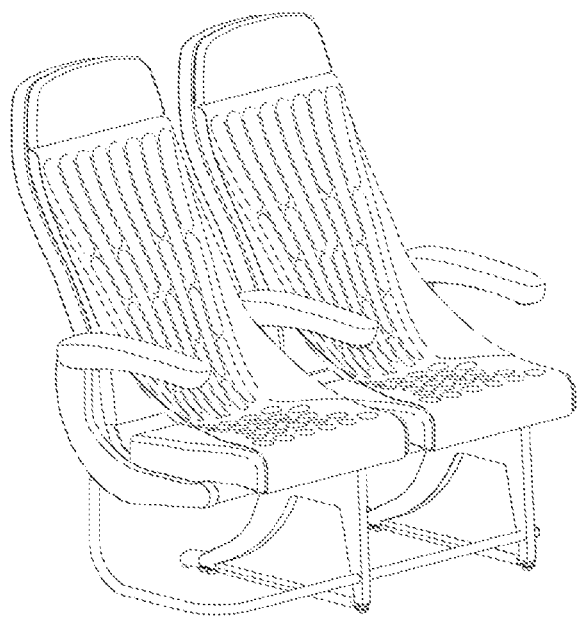
FIG. 10 is a perspective view of a pair of seats for a vehicle comprising the OSD of FIG. 1 in more fully reclined configuration than in FIG. 9.
Figure 11:
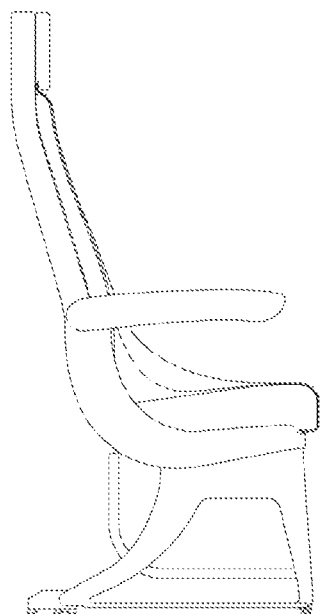
FIG. 11 is a side view of a pair of seats for a vehicle comprising the OSD of FIG. 1 in an upright configuration.
Figure 12:
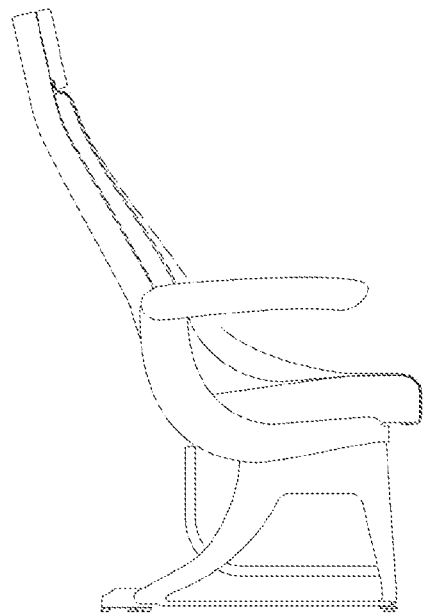
FIG. 12 is a side view of a pair of seats for a vehicle comprising the OSD of FIG. 1 in a partially reclined configuration compared to FIG. 11.
Figure 13:
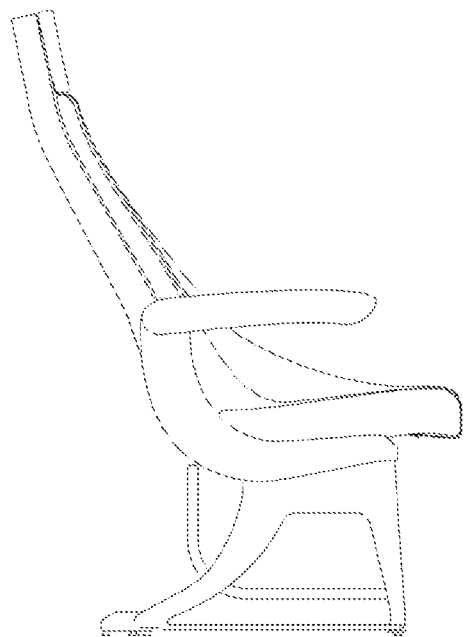
FIG. 13 is a side view of a pair of seats for a vehicle comprising the OSD of FIG. 1 in a more fully reclined configuration than in FIG. 12.
Figure 14:
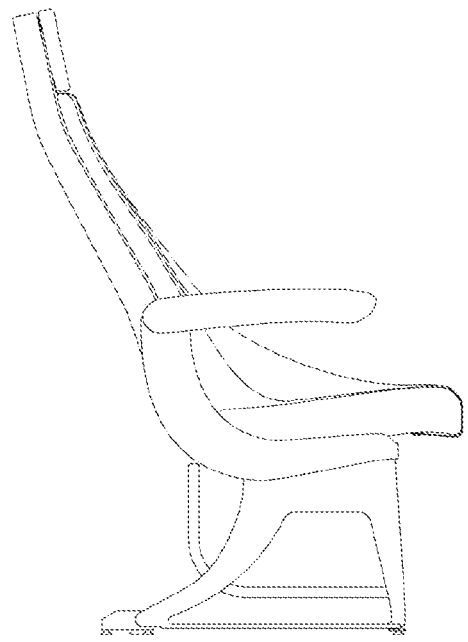
FIG. 14 is a side view of a pair of seats for a vehicle comprising the OSD of FIG. 1 in an upright configuration.
Figure 15:
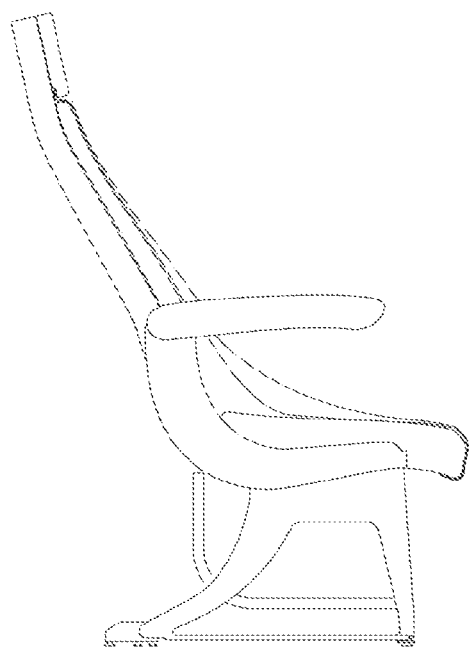
FIG. 15 is a side view of a pair of seats for a vehicle comprising the OSD of FIG. 1 in a more reclined configuration than in FIG. 14 with the seat base angled or tilted down relative to an angle of the seat base in an upright configuration of the seat.
Figure 16:
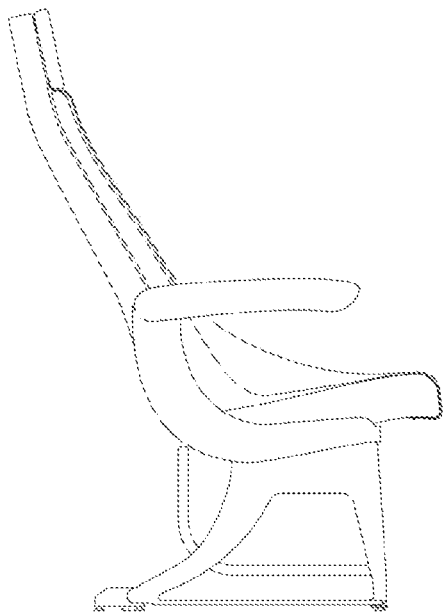
FIG. 16 is a side view of a pair of seats for a vehicle comprising the OSD of FIG. 1 in a more reclined configuration than in FIG. 14 with the seat base angled or tilted up relative to an angle of the seat base in an upright configuration of the seat.
Figure 17:
FIG. 17 is a perspective view of a pair of seats for a vehicle comprising the OSD of FIG. 1 in a reclined configuration with the seat base tilted down relative to an angle of the seat base in an upright configuration of the seat.

As shown in FIGS. 2 to 4, the OSD is attachable to a seat in a vehicle. It is removably attachable to the seat to facilitate cleaning, adjustment, repair, or replacement.

The OSD is coupled to the seat proximate a first end and a second end. Preferably, the OSD is not coupled to the seat at any other point between the first end and the second end. In other words, it is coupled to the seat only proximate its ends so that its movement is constrained only proximate its ends and is otherwise free to move relative to the seat.

The OSD be removably secured to a top or occupant-engaging side of a seat. Alternatively, one or both ends of the device may extend round and be removably secured to a back side or underside of the seat back and seat cushion. In a preferred configuration, a first end portion of the device may be removably secured to a front of an upper portion of the back rest and extend around a front edge of the seat base and be secured to a back side (or under side) of a front or end portion of the seat base.

Suitable means for removably coupling the OSD to the seat include quick-release type fasteners. For example, the flexible membrane may be coupled proximate its corners to the seat using one or more press studs or quarter turn fasteners 13 to locate it and hold it in place. Additional quick release type fasteners may be used to removably secure the OSD to the seat. For example, one or more zip fasteners 14 may be used to couple central portions of the first and/or second ends of the OSD to the seat as shown in FIG. 4.

Other suitable means for removably coupling the OSD to the seat include straps, preferably flexible but substantially non-extendable straps, for passing around the backrest and/or seat cushion and/or for attachment to the seat frame. The straps may be length adjustable to facilitate initial configuration of a seat comprising the OSD. This may also enable adjustment of the OSD for a given occupant.

Other suitable means for removably attaching the OSD to a seat will be readily apparent to the skilled person.

The topper is preferably removably coupled to the seat in the same manner as the flexible membrane to facilitate cleaning or replacement. As with the flexible membrane, the topper may be removably secured to an upper or end portion of the backside of the back rest and to a back side of a front or end portion of the seat base.

General Effect of the OSD

As will be apparent from the various Figures, the OSD is coupled to a seat and constrained only proximate its first and second ends. As such, the remainder of the OSD is generally free to move relative to the seat. This helps it to adapt and conform to the shape of a seat fitted with the OSD when in an upright configuration.

The OSD occupies the space between an occupant and the sitting surface or occupant-engaging surface of the seat. It has the freedom to extend away from or lift off from the sitting surface of the seat to prevent the formation of a gap that might otherwise open up between an occupant's body and the sitting surface, particularly between an occupant's lower back and the seat in the region of the articulation of the backrest and seat base, in particular when an occupant slides down or slouches in the seat or reclines the backrest relative to the seat base. The OSD is operable to prevent an occupant's body, particularly their lower back from falling into to the gap, thereby providing more effective support for a seat occupant. In providing greater support for the occupant's body, the OSD also prevents the occupant's muscles from working to maintain a supportive position and therefore provides additional comfort, particularly on long journeys. While a gap may still open up between the seat and the OSD, it will be appreciated that an occupant will more effectively supported than in a seat not fitted with the OSD.

Movement of the flexible membrane also provides additional support for an occupant as they change posture/sitting position and maintains the additional support in the new posture/sitting position.

Relative movement of the seat back and seat base, such as reclining of the seat back, or sliding of the seat base, or a combination of the two as described below will cause the membrane to wrap around the occupant's body, thereby distributing their weight more evenly over the OSD and reducing pressure points that might otherwise lead to discomfort and/or pain.

Effect of Reclining Movement of the Backrest

The OSD is likely to provide at least some additional support to a seat occupant in an upright configuration as compared to the seat alone not fitted with the OSD.

However, it will be appreciated, in particular with reference to FIGS. 5 to 13, that the OSD is more effective and provides additional support when the backrest is reclined from the upright configuration to a more reclined configuration. When this happens, there is a natural tendency for the occupant to slide down or slouch in the seat which typically opens up a gap between the occupant's lower back and the portions of the backrest and seat base proximate the articulation, or causes the occupant's lower back to fall into the gap. In these circumstances, the OSD is operable to provide additional support. The side or bolster portions of the flexible membrane also curve around the occupant's lower back, waist and thighs. This may help to prevent the occupant from slipping down the seat and may help to support the occupant's lower back, waist and thighs more effectively in a position elevated from the sitting surface of the seat.

This reclining movement of the seat base is achievable by a known type of seat comprising a known type of mechanism, for example, a simple articulation between the seat base and backrest and suitable hardware for limiting the travel of the backrest and returning it to the upright configuration. Other ways of achieving such movement will be apparent to the skilled person. Reclining and returning of the backrest may be initiated in a known manner, for example using manually or electrically operated seat controls.

As mentioned above, the OSD preferably offers greater flexibility in a transverse direction than in the longitudinal direction and greater stiffness in the longitudinal direction than in the transverse direction. This enables the flexible membrane to curve more readily in the transverse direction and curve around a seat occupant's body. This may be particularly beneficial in the event that an occupant turns partially onto their side to try to adopt a more comfortable, or simply a different, position as the flexible membrane will still offer even distribution of support and comfort.

Effect of Sliding Movement of the Seat Base

The inventors have appreciated that the OSD will be particularly beneficial in providing additional support when used in conjunction with a seat which has a mechanism for enabling the seat base to slide, for example in a fore-aft direction (when the seats are positioned facing in the direction of travel)—see also FIGS. 5 to 13.

This sliding movement of the seat base may be achieved by a known type of seat comprising a known type of mechanism, for example, pins coupled to the seat base running inside channels or slots or on slides on the seat frame and suitable hardware for limiting the travel of the seat base and returning it to the upright configuration. Other ways of achieving such movement will be apparent to the skilled person. Sliding of the seat base may be initiated in a known manner, for example using manually or electrically operated seat controls.

As the seat base slides forward, an end of the OSD coupled to the seat base is also moved forward relative to the backrest to which the other end is coupled. This urges the flexible membrane to lift off or extend away from the backrest and into engagement with the body of a seat occupant. As such, the OSD provides progressively more support to the occupant's body as the seat base slides forward. The side or bolster portions of the flexible membrane also curve around the occupant's lower back, waist and thighs to provide lateral support.

As mentioned above, the OSD preferably offers greater flexibility in a transverse direction than in the longitudinal direction and greater stiffness in the longitudinal direction than in the transverse direction. This enables the flexible membrane to curve more readily in the transverse direction. This may be particularly beneficial in the event that an occupant turns partially onto their side to try to adopt a more comfortable, or simply a different, position as the flexible membrane will still offer even distribution of support and comfort.

It will be appreciated that the greater the sliding movement of the seat base (i.e. the further it slides), the more effective the OSD will be in providing additional support and comfort. The device may therefore be particularly suitable for use in conjunction with a seat have an extended range of sliding movement of the seat base, which may be achieved by a staged or stepped sliding mechanism.

Effect of Sliding and Tilting Movement of the Seat Base

The inventors have appreciated that the OSD will be beneficial in providing additional support when used in conjunction with a seat which has a mechanism for also enabling the seat base to tilt up or down as it slides—see FIGS. 14 to 17.

This sliding and tilting movement of the seat base may be achieved by a known type of seat comprising and known type of mechanism, for example, comprising pins coupled to the seat base running inside channels or slots or on slides on the seat frame and suitable hardware for limiting the travel of the backrest and returning it to the upright configuration. Other ways of achieving such movement will be apparent to the skilled person. Reclining of the backrest may be initiated in a known manner, for example using manually or electrically operated seat controls.

As the seat base tilts up or down, an end of OSD coupled to the seat base is also moved relative to the backrest to which the other end is coupled. This urges the flexible membrane away from the backrest and into engagement with the occupant's body. As such, the OSD provides progressively more support to the occupant's back. The side or bolster portions of the flexible membrane also curve around the occupant's lower back, waist and thighs and provide increased lateral support.

As mentioned above, the OSD preferably offers greater flexibility in a transverse direction than in the longitudinal direction and greater stiffness in the longitudinal direction than in the transverse direction. This enables the flexible membrane to curve more readily in the transverse direction. This may be particularly beneficial in the event that an occupant turns partially onto their side to try to adopt a more comfortable, or simply a different, position as the flexible membrane will still offer even distribution of support and comfort.

Effect of Turning or Swivelling Movement of the Seat Base

Figure 18:
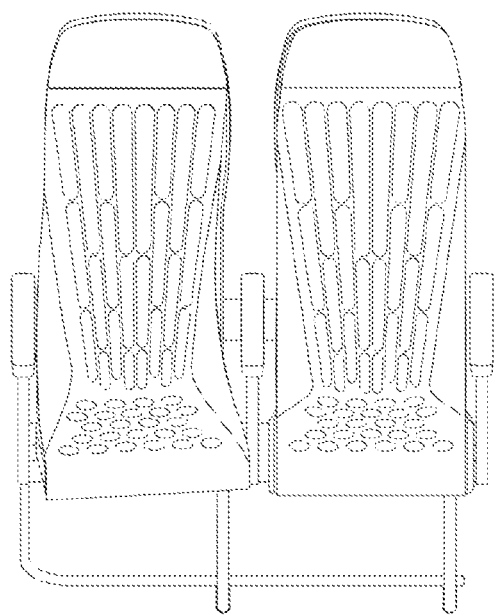
FIG. 18 is a front view of a pair of seats for a vehicle comprising the OSD of FIG. 1 in which a seat base of the left hand seat has been turned or swivelled in towards the right hand seat, relative to a position of the seat base in an upright configuration of the seat.
Figure 19:
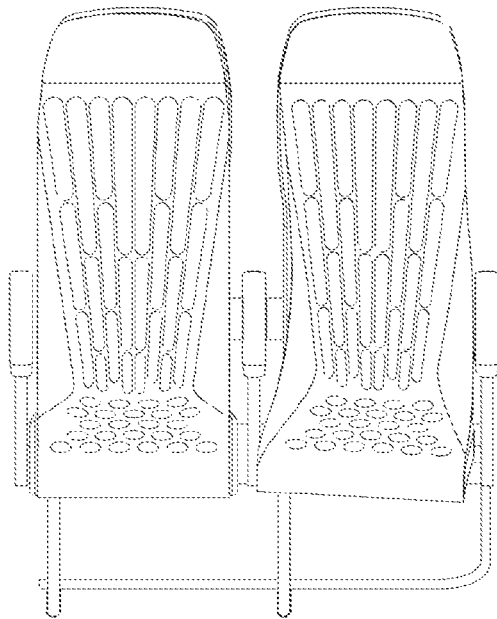
FIG. 19 is a front view of a pair of seats for a vehicle comprising the OSD of FIG. 1 in which a seat base of the right hand seat has been swivelled or angled in towards the left hand seat, relative to a position of the seat base in an upright configuration of the seat.
Figure 20:
FIG. 20 is a perspective view of a pair of seats for a vehicle comprising the OSD of FIG. 1 in which a seat base of the right hand seat has been swivelled or angled in towards the left hand seat, relative to a position of the seat base in an upright configuration of the seat.

The inventors have appreciated that the OSD will be beneficial in providing additional support when used in conjunction with a seat which has a mechanism for also enabling the seat base to turn or swivel, whether or not it also slides and/or tilts—see FIGS. 18 to 20.

A suitable seat may comprise a central pivot for the seat base which enables the seat base to turn or swivel relative to the frame and suitable hardware for limiting the travel of the seat base and returning it to the upright configuration. It may also comprise a latch for securing the seat base in a rotated position. Other suitable mechanisms for achieving such turning or swivelling movement will be apparent to the skilled person. Turning or swivelling of the seat base may be initiated in a known manner, for example using manually or electrically operated seat controls.

As the seat base is turned, the OSD has the freedom to twist and move away from the seat into engagement with an occupant's body to provide distributed support. This may be particularly beneficial in enabling a seat occupant to rotate their body to position that approximates sleeping on their side.

As mentioned above, the OSD preferably offers greater flexibility in a transverse direction than in the longitudinal direction and greater stiffness in the longitudinal direction than in the transverse direction. This enables the flexible membrane to curve more readily in the transverse direction. This may be particularly beneficial in the event that an occupant turns partially onto their side to try to adopt a more comfortable, or simply a different, position as the flexible membrane will still offer even distribution of support and comfort.

Effect of Concerted Movement of the Backrest and Sliding Seat Base

The inventors have appreciated that the OSD will be of greatest benefit in providing additional support when used in conjunction with a seat which has a mechanism for enabling the backrest to be reclined and the seat base to slide (and potentially also to tilt and/or swivel as it slides), for example in a fore-aft direct when the seats are positioned facing in the direction of travel, in a concerted manner. In other words the OSD will be particularly beneficial in providing additional support when used in conjunction with a seat which has a mechanism which progressively moves the seat base forward (when the seats are positioned facing in the direction of travel) as the backrest is reclined, and of even greater benefit when the seat has a mechanism which slides the seat base forward by a substantial distance within the confines of the space available. The effect and benefits of the OSD may be further increased where the seat mechanism also enables the front of the seat base to tilt up or down as the backrest is reclined and the seat base slides forward.

This concerted reclining and sliding movement of the seat base may be achieved by a known type of seat comprising a known type of mechanism, for example, a mechanism comprising an articulation and pins coupled to the seat base and/or backrest running inside channels or slots or on slides on the seat frame suitable hardware for limiting the travel of the backrest and/or seat base and returning it to the upright configuration. Other ways of achieving such movement will be apparent to the skilled person. Concerted movement of the backrest and seat base may be initiated in a known manner, for example using manually or electrically operated seat controls As the seat base slides forward (assuming the seats are positioned facing in the direction of travel), an end of OSD coupled to the seat base is also moved forwards relative to the backrest to which the other end is coupled. This urges the flexible membrane away from the backrest and into engagement with the occupant's back. As such, the OSD provides progressively more support to the occupant's back. The side or bolster portions of the flexible membrane also curved around the occupant's lower back, waist and thighs.

As mentioned above, the OSD preferably offers greater flexibility in a transverse direction than in the longitudinal direction and greater stiffness in the longitudinal direction than in the transverse direction. This enables the flexible membrane to curve more readily in the transverse direction. This may be particularly beneficial in the event that an occupant turns partially onto their side to try to adopt a more comfortable, or simply a different, position as the flexible membrane will still offer even distribution of support and comfort.

Other Optional Features

A seat with which the OSD may be used may comprise one or more latches (not shown) restricting movement of the seat and thereby restricting movement of the OSD. This may be particularly suitable where the OSD is used in conjunction with aircraft seats. For example, a latch may need to be operated to enable the backrest to be reclined and/or the seat base to be moved to activate the OSD. A further latch may be operated to hold the seat in partially or fully reclined configuration to prevent further movement of the seat and OSD when a comfortable position is selected by a seat occupant.

A seat with which the OSD may be used may comprise a leg rest and/or foot rest (not shown) for added comfort and support for a seat occupant.

The OSD may be provided with entrapment prevention panels (not shown) extending between the flexible membrane and a surface of the underlying seat to prevent entrapment and to prevent articles being pushed into the gap beneath the surface OSD which might become trapped as the seat is returned to the upright configuration.

The OSD may be provided with one or more inflatable bladders which can be inserted into the bolster portions and/or into the backrest portion, to enable a size and configuration of the OSD to be adjusted or tuned (e.g. to adjust the size and/or shape and/or weight and/or proportions of the flexible membrane) for their own comfort. For example, an inflatable bladder in the backrest portion could be used to vary the lumbar support. The inflatable bladders could be inflated by a small hand pump or an electrically driven pump.

The OSD may be provided with a headrest portion. This may be integral with the flexible membrane or may be a separate component. A headrest may alternatively be provided on the topper or as part of a seat with which the OSD may be used.

The invention claimed is:

1. An occupant support device for use in conjunction with an adjustable seat, the occupant support device comprising:
a flexible membrane having a first end and a second end, the flexible membrane configured for being coupled to a backrest portion of the adjustable seat proximate the first end of the flexible membrane and configured for being coupled to a seat base portion of the adjustable seat proximate the second end of the flexible membrane;
wherein the flexible membrane is configured for being coupled to the adjustable seat only proximate the first end and the second end of the flexible membrane;
wherein the device is configured so that the flexible membrane when coupled to the adjustable seat extends between the backrest portion and the seat base portion of the adjustable seat and so that the flexible membrane is movable relative to the adjustable seat in response to adjustment of the adjustable seat to maintain supporting engagement of the flexible membrane with a seat occupant; and
wherein the occupant support device further comprises at least one elongate stiffening member for stiffening the flexible membrane, wherein the at least one elongate stiffening member is orientated longitudinally so that the flexible membrane is stiffer in a longitudinal direction than in a transverse direction.

2. The occupant support device according to claim 1, wherein the flexible membrane comprises a backrest portion, a seat base portion and an intermediate portion, and wherein the backrest portion, seat base portion and intermediate portion are coupled so that the flexible membrane is pre-formed with a three-dimensional profile.

3. The occupant support device according to claim 2, wherein the flexible membrane is configured so that the three-dimensional profile is generally conformable to a shape of a body of the seat occupant.

4. The occupant support device according to claim 1, wherein the at least one stiffening member is insertable in the flexible membrane.

5. The occupant support device according to claim 4, wherein the at least one stiffening member is a plurality of stiffening members.

6. The occupant support device according to claim 5, wherein the plurality of stiffening members is provided substantially over the whole of an area of the flexible membrane.

7. The occupant support device according to claim 5, wherein the plurality of stiffening members is provided on a side opposite an occupant-engaging side of the flexible membrane.

8. The occupant support device according to claim 5, wherein at least two of the stiffening members are arranged in a staggered arrangement so that at least one pair of transversely adjacent stiffening members only partially overlap in a longitudinal direction.

9. The occupant support device according to claim 5, wherein one or the more of the plurality of stiffening members is arranged to extend from a backrest portion of the flexible membrane around an intermediate portion of the flexible membrane and onto a seat base portion of the flexible membrane, either continuously or through a series of the stiffening members positioned end to end.

10. The occupant support device according to claim 5, wherein at least one of the plurality of stiffening members positionable in a backrest portion of the flexible membrane is longer than at least one of the plurality of stiffening members positionable in a seat base portion of the flexible membrane.

11. The occupant support device according to claim 1, wherein the at least one stiffening member comprises a phenolic resin or fibre-reinforced polymer.

12. The occupant support device according to claim 1, wherein the flexible membrane comprises a poly cotton fabric.

13. The occupant support device according to claim 1, wherein the flexible membrane is removably coupleable to a seat.

14. The occupant support device according to claim 13, wherein the flexible membrane is removably coupleable to the adjustable seat on a side of the seat opposite to an occupant-engaging side of the seat and wherein a first end and/or a second end of the flexible membrane extends around a corresponding second end of the seat.

15. The occupant support device according to claim 13, wherein the flexible membrane is removably coupleable to a seat using at least one quick release fastener.

16. The occupant support device according to claim 13, wherein the flexible membrane is removably coupleable to a seat by a combination of press studs and zip fasteners.

17. The occupant support device according to claim 1, further comprising a padded topper.

18. A seat for a vehicle, comprising the occupant support device of claim 1.

19. A seat for a vehicle, comprising:
a backrest portion, a seat base portion, an articulation between the backrest portion and the seat base portion so that the backrest is reclinable;
a seat base adjustment mechanism configured to permit movement of the seat base portion; and
an occupant support device according to claim 1.

20. The seat for a vehicle according to claim 19, wherein the seat base adjustment mechanism permits both sliding and tilting movement of the seat base portion.

21. An array of seats comprising an occupant support device according to claim 1.

22. A vehicle comprising an occupant support device according to claim 1.

* * * * *